US008654612B2

(12) United States Patent
Adler et al.

(10) Patent No.: US 8,654,612 B2
(45) Date of Patent: Feb. 18, 2014

(54) SYSTEM AND METHOD FOR DETECTING BATS AND THEIR IMPACT ON WIND FACILITIES

(75) Inventors: Michael J. Adler, Gainesville, FL (US); Christian M. Newman, Gainesville, FL (US); Christine L. Sutter, Gainesville, FL (US); Carla Ebeling, Eden, TX (US); Chris Ribe, Gainesville, FL (US); Peter West, Gainesville, FL (US)

(73) Assignee: Normandeau Associates, Inc., Bedford, NH (US)

( * ) Notice: Subject to any disclaimer, the term of this patent is extended or adjusted under 35 U.S.C. 154(b) by 0 days.

(21) Appl. No.: 13/563,256

(22) Filed: Jul. 31, 2012

(65) Prior Publication Data

US 2012/0300589 A1    Nov. 29, 2012

Related U.S. Application Data

(62) Division of application No. 12/486,552, filed on Jun. 17, 2009.

(60) Provisional application No. 61/073,215, filed on Jun. 17, 2008.

(51) Int. Cl.
*G01S 15/04*    (2006.01)
*G01V 1/00*    (2006.01)

(52) U.S. Cl.
CPC .................................... *G01V 1/001* (2013.01)
USPC ......................................................... 367/136

(58) Field of Classification Search
USPC ......................................................... 367/136
See application file for complete search history.

(56) References Cited

U.S. PATENT DOCUMENTS

| 4,408,533 A | 10/1983 | Owen et al. |
| 4,885,724 A | 12/1989 | Read et al. |

(Continued)

FOREIGN PATENT DOCUMENTS

| JP | 2007292645 | 11/2007 |
| WO | 2009/155348 | 12/2009 |

OTHER PUBLICATIONS

Ahlen I., Baagoe H.J., "Use of ultrasound detectors for bat studies in Europe; experiences from field identification, surveys, and monitoring" Acta Chiropterologica, vol. 1, No. 2, pp. 137-150, 1999.

(Continued)

*Primary Examiner* — Isam Alsomiri
*Assistant Examiner* — James Hulka
(74) *Attorney, Agent, or Firm* — Joseph R. Englander; Shutts & Bowen LLP

(57) ABSTRACT

The present invention relates to a system and method for detecting bats from a remote location. In one aspect the invention provides a bat detection system comprising an upper detection unit connected to a base computer unit. The upper detection unit can be positioned on a vertical structure, and a second lower detection unit, or additional detection units, can also be positioned on the vertical structure. Each detection unit comprises a housing which is connected to, and contains, an audio detector. The base computer unit is enclosed by a housing and comprises a data processor, a data storage device, and a remote communication interface device. The data processor is operatively connected to the data storage device, remote communication interface device, and the audio detectors of any detection units positioned on the vertical structure. The base computer unit communicates with a remote computer transferring information regarding the bat sounds detected by the detection units.

33 Claims, 8 Drawing Sheets

(56) References Cited

U.S. PATENT DOCUMENTS

| | | | |
|---|---|---|---|
| 5,357,795 A * | 10/1994 | Djorup | 73/170.12 |
| 5,691,514 A | 11/1997 | Landis | |
| 5,956,463 A | 9/1999 | Patrick et al. | |
| 6,301,513 B1 | 10/2001 | Divon et al. | |
| 6,400,647 B1 * | 6/2002 | Huntress | 367/136 |
| 6,676,233 B1 | 1/2004 | Evans et al. | |
| 6,685,638 B1 * | 2/2004 | Taylor et al. | 600/437 |
| 6,914,674 B1 * | 7/2005 | Wang | 356/338 |
| 7,489,255 B2 * | 2/2009 | Sonoura | 340/8.1 |
| 8,379,486 B2 * | 2/2013 | Adler et al. | 367/136 |
| 2002/0067661 A1 | 6/2002 | Huntress | |
| 2002/0072026 A1 * | 6/2002 | Lynam et al. | 432/77 |
| 2003/0086077 A1 * | 5/2003 | Kayano et al. | 356/121 |
| 2003/0128130 A1 | 7/2003 | Kao | |
| 2003/0171171 A1 | 9/2003 | Fair | |
| 2004/0020701 A1 * | 2/2004 | Aoki | 180/274 |
| 2005/0283309 A1 * | 12/2005 | Sonoura | 701/207 |
| 2006/0018198 A1 | 1/2006 | McDonald et al. | |
| 2006/0053944 A1 * | 3/2006 | Pomerleau et al. | 74/502.4 |
| 2006/0144139 A1 * | 7/2006 | Miyagawa | 73/290 V |
| 2006/0146652 A1 | 7/2006 | Huizi et al. | |
| 2006/0239121 A1 | 10/2006 | Kong et al. | |
| 2007/0019505 A1 | 1/2007 | Lohrmann et al. | |
| 2007/0119438 A1 | 5/2007 | Pittman | |

OTHER PUBLICATIONS

O'Donnell C., and Sedgeley J., "An automatic monitoring ystem for recording bat activity" Dept. of Conservation Technical Series, NZ Dept of Conservation, ISBN 0-478-01607-7, Jul. 1994.

Theodore J. Weller and Cynthia J. Zabel., "Variation in Bat Detections due to Detector Orientation in a Forest". Wildlife Society Bulletin, vol. 30, No. 3 (Autumn, 2002), pp. 922-930.

P. Marcos Gorresen, Adam C. Miles, Christopher M. Todd, Frank J. Bonaccorso, and Theodore J. Weller, "Assessing Bat Detectability and Occupancy with Multiple Automated Echolocation Detectors". Journal of Mammalogy, 89(1): 11-17.2008.

Michael J O'Farrell; Bruce W Miller; William L Gannon., "Qualitative identification of free-flying bats using the anabat detector". Journal of Mammalogy; Feb. 1999; 80, 1 pg. 11-23.

* cited by examiner

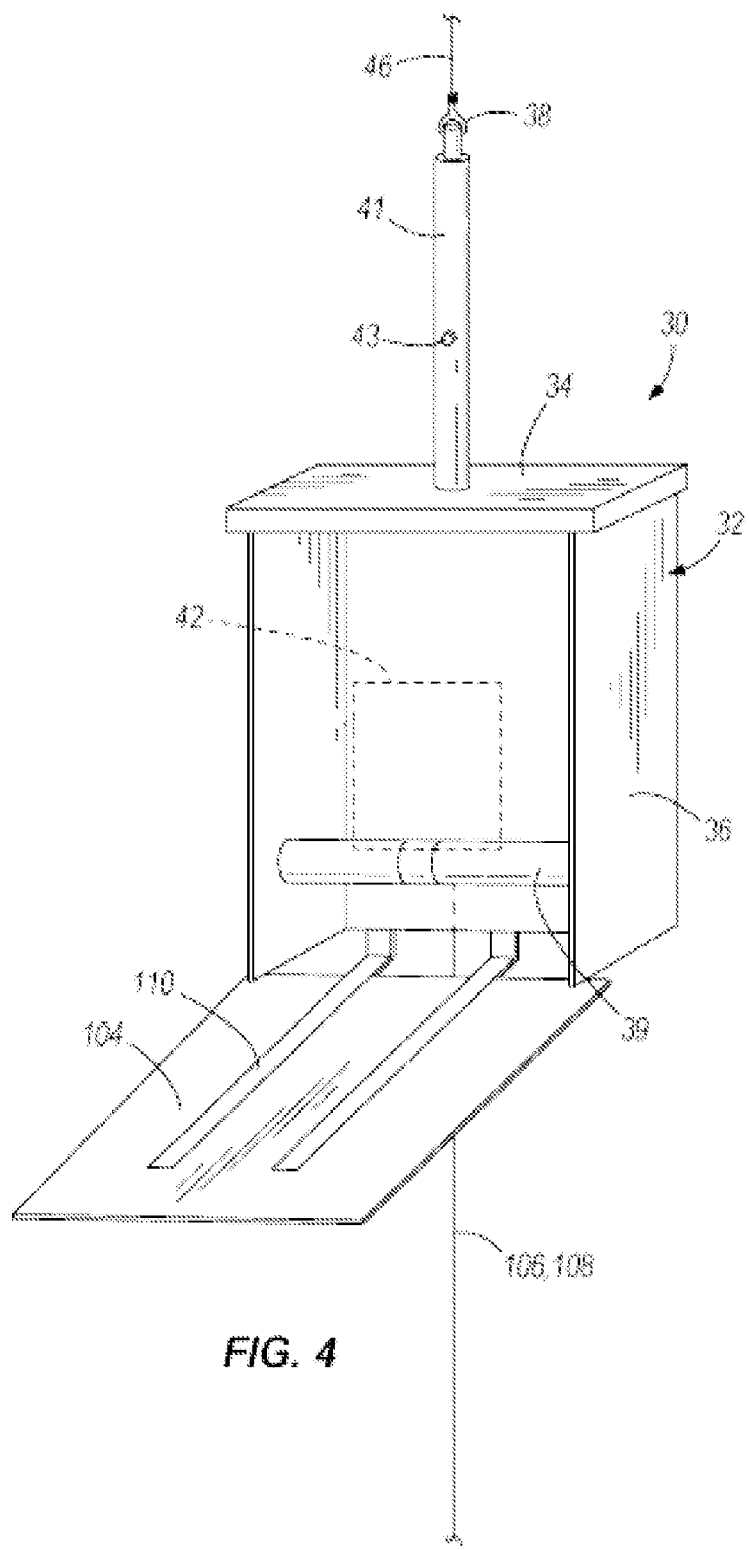
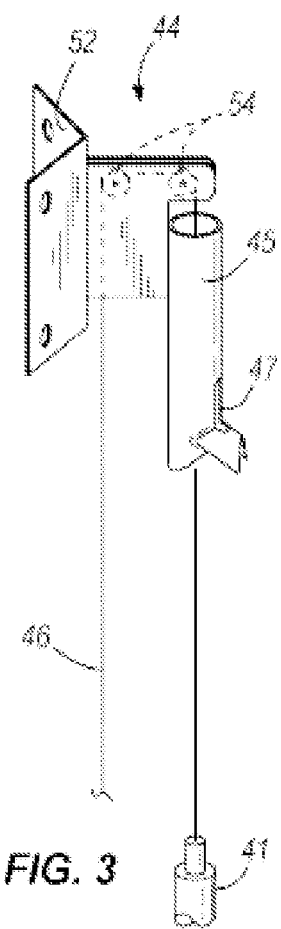
FIG. 3
FIG. 4

SYSTEM AND METHOD FOR DETECTING BATS AND THEIR IMPACT ON WIND FACILITIES

CROSS REFERENCE TO RELATED APPLICATIONS

This application is a divisional of U.S. Pat. No. 8,379,486, issued on Feb. 19, 2013, and claims the benefit of priority to U.S. Provisional Patent Application No. 61/073,215, filed Jun. 17, 2008, which is incorporated herein by reference in its entirety.

FIELD OF THE INVENTION

With the current increase in development of renewable energies, wind power has had more widespread use. The big turbines, which look like high-tech windmills and turn wind into electricity, are going up on wind-swept sites around the United States. But as wind energy facilities proliferate, an unforeseen problem is turning up: bat mortality is being reported at unprecedented levels. As a result, more and more studies are being required to determine the possible impact of such wind energy facilities on bats.

Since the late 1930s when D. R. Griffin first discovered that bats navigate using echolocation, bat scientists have been trying to use this knowledge to study bats. In the last ten years bat detectors have been relatively portable handheld devices that can be used to detect ultrasonic (>20 KHz) bat calls. Three major types of bat detectors—heterodyne, frequency division, and time expansion, are used to shift the bat's ultrasonic frequencies down to the human hearing range. However, each of these techniques has significant limitations for bat activity monitoring and species identification.

Heterodyning signal processing sensors (manual and autoscanning) present difficulties in that they sample only a portion of the frequency range of the call. Furthermore, such sensors do not preserve harmonics of the bat call. Additionally, manual scanning heterodyning signal processing sensors easily miss bats whose call frequency falls outside of the frequency band (about 5 KHz) being monitored.

Frequency division signal processing sensors have problems with signal quality and do not preserve the harmonics of the bat call.

Time expansion signal processing sensors have problems in that the time-expansion factor of the sensors limits capability to create indices abundance. For example, a time expansion of 1/32 means that it takes 32 seconds to record 1 second of calls, thus precluding other bat calls from being detected and recorded during these 32 seconds.

The commercially available versions of heterodyne, frequency division and time expansion, and frequency expansion (Binary) bat detectors are designed to detect bat calls. Some models also record calls either via built-in capabilities or with the purchase of additional hardware (frequently from a separate vendor). None were developed for monitoring at wind energy facilities and thus all have one or more significant limitations when used under such conditions. Limitations include: lack of extended power for multi-month monitoring periods, frequent field checks needed to ensure system function and retrieve data (otherwise the system often fails to collect data for extended periods and/or the data card overflows and no more data is collected until a new data card is inserted), lack of communication with remote systems of system managers (this prevents us from knowing that the system has encountered a problem and needs human intervention to become operational again); inability to raise monitoring equipment to the necessary heights (e.g. rotor swept height (around 50 m from the base); inability to transmit the signal cleanly and reliably between the deployment height (50 m) and the data collection equipment at the tower base; the system components are unable to withstand a broad range of environmental conditions; and they have excessive power demands.

Because of the above and many other limitations, bat scientists have not been able to systematically and remotely monitor, record, and transmit bat calls over an extended period of time from the field from many locations simultaneously at heights relevant to wind facility siting and operation. It has never been done as research, for commercial application, nor has it ever been done as it relates to collecting bat information on wind energy facilities for the wind energy industry.

SUMMARY OF THE INVENTION

The present invention relates to a system and method for detecting bats. One suitable use for the bat detection is to detect the presence of bats at proposed and existing wind energy facility locations, though the detection system can be used to detect bats for a variety of purposes and in a variety of conditions.

In one aspect the invention provides a bat detection system comprising an upper detection unit connected to a base computer unit. In one embodiment the upper detection unit is positioned on a vertical structure. A second lower detection unit, or additional detection units, can also be positioned on the vertical structure. Each detection unit comprises a housing which is connected to and contains an audio detector. The base computer unit is enclosed by a housing and comprises a data processor, a data storage device; and a remote communication interface device. The data processor is operatively connected to the data storage device, remote communication interface device, and the audio detectors of any detection units positioned on the vertical structure.

The detection units can be mounted directly to the vertical structure or can be connected to the vertical structure by way of a connection cable. A connection cable is attached to the housing of the detection unit and is passed through a pulley mounted to the vertical structure, such that the connection cable allows for the detection unit to be raised, lowered, or positioned at a specific height on the vertical structure. The end of the connection cable not connected to the detection unit can be secured to any fixed structure, such as a cleat mounted on the vertical structure, to secure the vertical positioning of the detection unit.

The pulley can be attached to the vertical structure by a pulley bracket. The pulley bracket comprises a mounting bracket which is mounted directly to the vertical structure. A pulley or pulleys are attached to the mounting bracket. In one embodiment, the pulley bracket also contains a sleeve attached to the bracket. In this embodiment the detection unit has an extension arm attached to the top of the housing of the unit. The extension arm is attached at one end to the housing of the detection unit and at the other end to the connection cable by way of a cable connector. The extension arm can be received by the sleeve of the pulley mounting bracket. When the detector is raised close to the pulley bracket, the sleeve of the pulley bracket receives the extension arm of the detector unit and adds greater stability to the detector unit.

The audio detector of the detector units is suitably an ultrasonic receiver. The ultrasonic receiver can be operatively connected to an ultrasonic digitizer which translates the signals from the receiver into data that can be received by the data processor in the base computer unit. In one embodiment the digitizer is located in the detector unit, in another embodiment the digitizer is located in the base computer unit, and in another embodiment the digitizer is integral to the ultrasonic receiver.

In one embodiment the bat detection system is powered by means of a solar array. An array of solar panels are operatively connected to a battery unit. The battery unit comprises a housing containing a charge controllers and batteries to store the charge generated by the solar panels. The battery unit being operatively connected to provide power to the detector units and the base computer unit.

In another embodiment the invention provides a method of detecting bat sounds using the bat detection system of the invention. The audio detectors feed continuous data to the data processor in the base computer unit. The data provided by the audio detector(s) contain information concerning sound detected by the audio detectors including information on the intensity of the sound detected and the frequency of the sound detected. The data processor is programmed to run a filter analysis on this continuously streamed data. In the filter analysis process the data is analyzed so that when the intensity of the sound reaches a preset threshold and falls within a certain frequency range, the data processor records this data as a sound file of a fixed length on the data storage device. The data processor can be programmed to perform the filter analysis starting at one hour before sunset and ending one hour after sunrise each day.

The data processor can also be programmed to create a log file on the data storage device. In this log file the data processor creates a time stamped data entry at a regular interval indicating if data is being received from the audio detector. The data processor can also record in the log file each time a sound file is recorded and record the name of the sound file and the time it was created in the log file.

The data processor is also programmed to perform a bat call identification analysis on the sound files recorded. The bat call identification analysis determines whether the sound file contains a bat sound. After the analysis the data processor marks in a log file on the data storage device indicating if the sound file contains a bat call or does not contain a bat call.

The data processor transmits the sound files recorded via the modem to a remote computer. The remote computer receives the sound files from the bat detection system. In one embodiment, the remote computer receives the sound files from multiple bat detection systems, each bat detection system being located at a different geographic location. The remote computer can be programmed to perform an ingest process. The ingest process records information concerning the sound files into a database file stored on a data storage device associated with the remote computer. The information recorded in the database includes the name of the sound file, whether the sound file includes a bat call, the time the sound file was recorded and the specific bat detection system that recorded the sound file.

The method for detecting bat sounds described above can also be performed with an audio detector associated with a suitably programmed data processor operatively connected to a data storage device and a modem using the same steps and programs described above.

BRIEF DESCRIPTION OF THE DRAWINGS

FIG. 3 shows a depiction of the pulley bracket of the present invention.
FIG. 4 shows a front perspective view of one embodiment of the detection unit of the present invention with the front sidewall of the detection unit shown in a transparent fashion to indicate the inside of the unit.

DETAILED DESCRIPTION OF THE INVENTION

Figure 1:
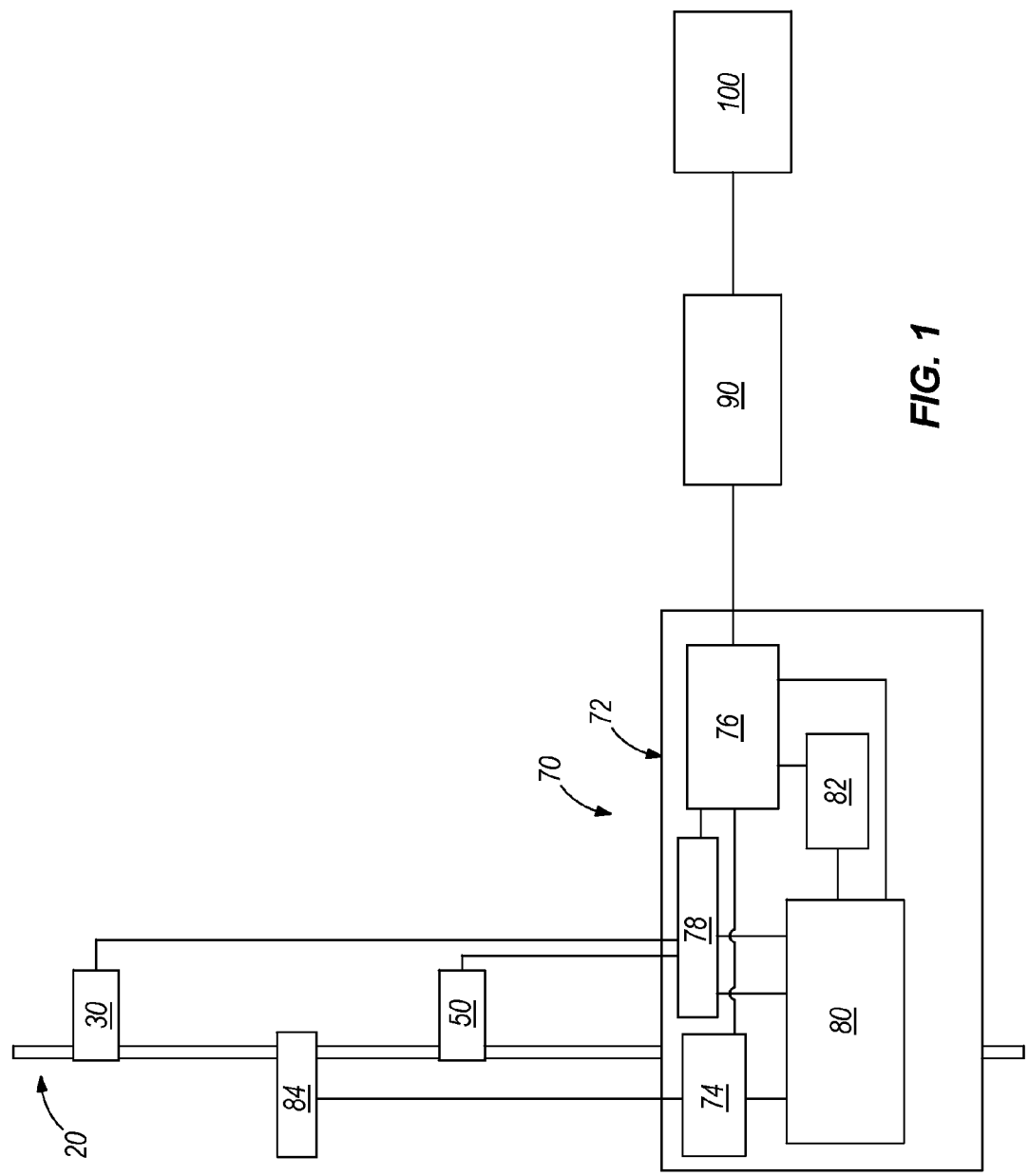
FIG. 1 shows a schematic diagram of the bat detection system of the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including", "having" and "comprising" and variations thereof herein is meant to encompass the items listed thereafter and equivalents thereof as well as additional items and equivalents thereof. Furthermore, unless specified or limited otherwise, the terms "mounted," "connected," "supported," and "coupled" and variations thereof are used broadly and encompass both direct and indirect mountings, connections, supports, and couplings. For example, the connection of one item to another may be done through an intermediate structure or item. Also, unless specified or limited otherwise, the term "operatively connected" means that the items are connected to each other so as to operate together as one of ordinary skill in the art would expect. For example, a battery unit operatively connected to a computer and/or an audio detector is connected in such a way that power can be transferred from the battery unit to the computer and audio detector. Another example would be a data processor operatively connected to a data storage device that allows for the data processor to transmit data through the connection to the data storage device.

Additionally, as used herein, the term "computer" can comprise an input device, an output device, a computer-readable storage medium, and a data processor. Possible input devices include a keyboard, a computer mouse, a touch screen, and the like. Output devices include a cathode-ray tube (CRT) computer monitor, a liquid-crystal display (LCD) computer monitor, and the like. Storage media include various types of memory such as a hard disk, RAM, flash memory, and other magnetic, optical, physical, or electronic memory devices. The data processor is any typical computer processor for performing calculations as well as for directing other functions related to performing input, output, calculation, and display of data associated with the computer. Those aspects of the methods of the present invention that are implemented on a computer system or data processor comprise instructions and data that are stored on the storage medium. In one embodiment, the computer system includes a server and in one particular embodiment the server is configured to operate as a web server. The computer system can also include a network connection (wired or wireless) which in turn can connect to a computer network. The network connection can serve as an additional source of input and output for the computer system.

It also is understood that any numerical value recited herein includes all values from the lower value to the upper value. For example, if a height range is stated as 40 to 60 meters, it is intended that values such as 42 to 45, 46 to 55, or 50 to 59, etc., are expressly enumerated in this specification. These are only examples of what is specifically intended, and all possible combinations of numerical values between the lowest value and the highest value enumerated are to be considered to be expressly stated in this application.

The present invention provides a system and method for detecting bats. The system records, stores, and transmits bat call data from the field to a central location and enables people to monitor, assess, and maintain the system and bat data remotely without having to travel to the sensor site. The system is particularly designed to detect the presence of bats in areas that would be affected by wind energy facility activities utilizing wind turbines.

A schematic overview of one embodiment of the bat detection system of the present invention is best shown in FIG. 1. In this embodiment the bat detection system comprises a vertical structure 20, an upper detector unit 30 connected to the vertical structure 20, a lower detector unit 50, and a base computer unit 70 connected to the detector units 30, 50. The vertical structure 20 can be any suitable structure having a vertical height that a detector unit can be connected to, such as a tower, pole, meteorological tower, antenna tower, building, cave wall, cliff face, tree or the like. Suitably the pole is at a height whereby the detector unit 30 can be mounted to determine the presence of bats at heights within the rotor swept area of a wind turbine. Suitable heights include 45 meters and greater from the ground, though any desired height can be used.

Figure 2:
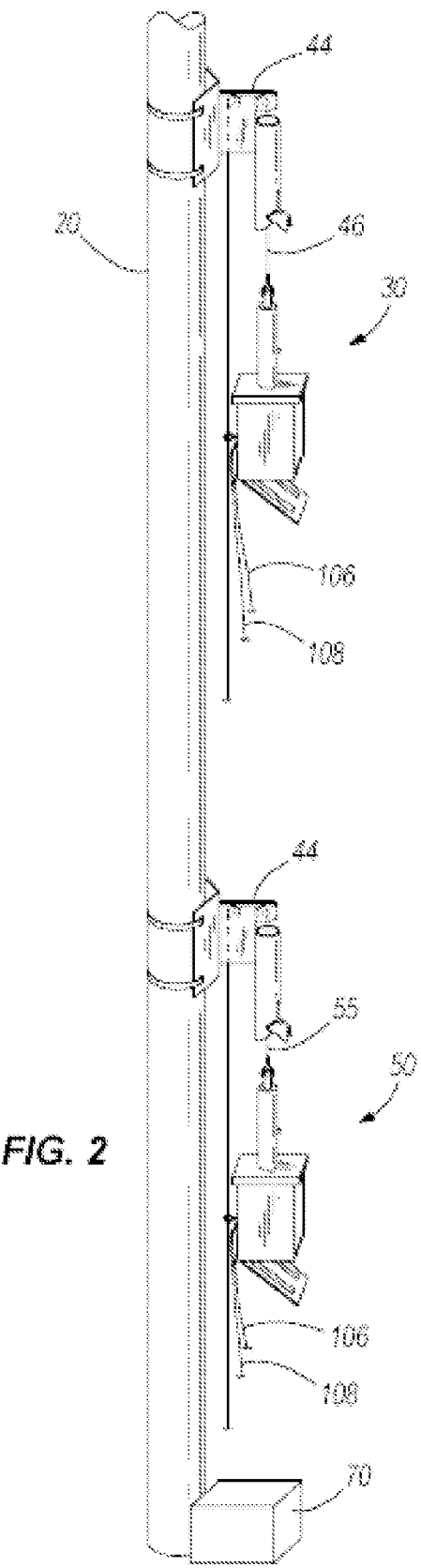
FIG. 2 shows a picture of the vertical structure and detection units of the bat detection system of the present invention.

The detection units 30, 50 are best shown in FIGS. 2 and 4. The detection unit 30, 50 comprises a housing 32 and an audio detector 42. Suitably the housing is weather proof and can protect components contained within the housing 32 from the elements. The housing 32 has a top 34 and sidewalls 36 on the sides, front and back of the housing 32. The housing can also have a back cable connector 40 on the back sidewall 36 of the housing 32. A separate guide cable can be connected to the back cable connector to help guide the detector unit when it is being raised or lowered by the connection cable. The housing also has a cable connector 38 connected to the top 34 of the housing. This cable connector 38 can either be directly connected to the housing 32, or in one embodiment can be mounted to an extension arm 41 which is connected to the housing 32. The audio detector is connected to the interior of the housing 32. In one embodiment the housing 32 of the detector unit is open on the bottom and contains a reflection plate 104 which extends from the bottom of the housing 32 outward toward the front of the detection unit 30. This reflection plate 104 can be connected to the housing 32 by mounting arms 110 which are connected to the plate 104 and the housing 32. The reflection plate 104 is suitably positioned at a 45.degree. angle from the back sidewall 36 of the housing 32 and allows for the reflection of sound waves into the interior of the detection unit 30 where the audio detector 42 is positioned. In one embodiment the reflection plate 104 is 9.times.9 in. and is positioned with 2-3 inches from the microphone/receiver of the audio detector unit 42 of the detector. Furthermore, the reflection plate 104 is suitable wider that the width of the front and back sides 36 of the housing 32.

Data 106 and power 108 cables are fed through an opening in the bottom of the housing 32 to connect to the audio detector 42. In one embodiment the housing 32 of the detector unit 30, 50 can have a support bar 39 mounted internally in the housing 32 connecting the side walls of the housing 36. The cables 106 and 108 can also be wrapped around the support bar 39. In some embodiments the detector units can also contain signal boosting devices such a USB boosters to help boost the signal from the audio detector 42, and can also include power and data cable lightening protection devices to help shield electrical equipment from damage from lightening strikes.

Figure 7:
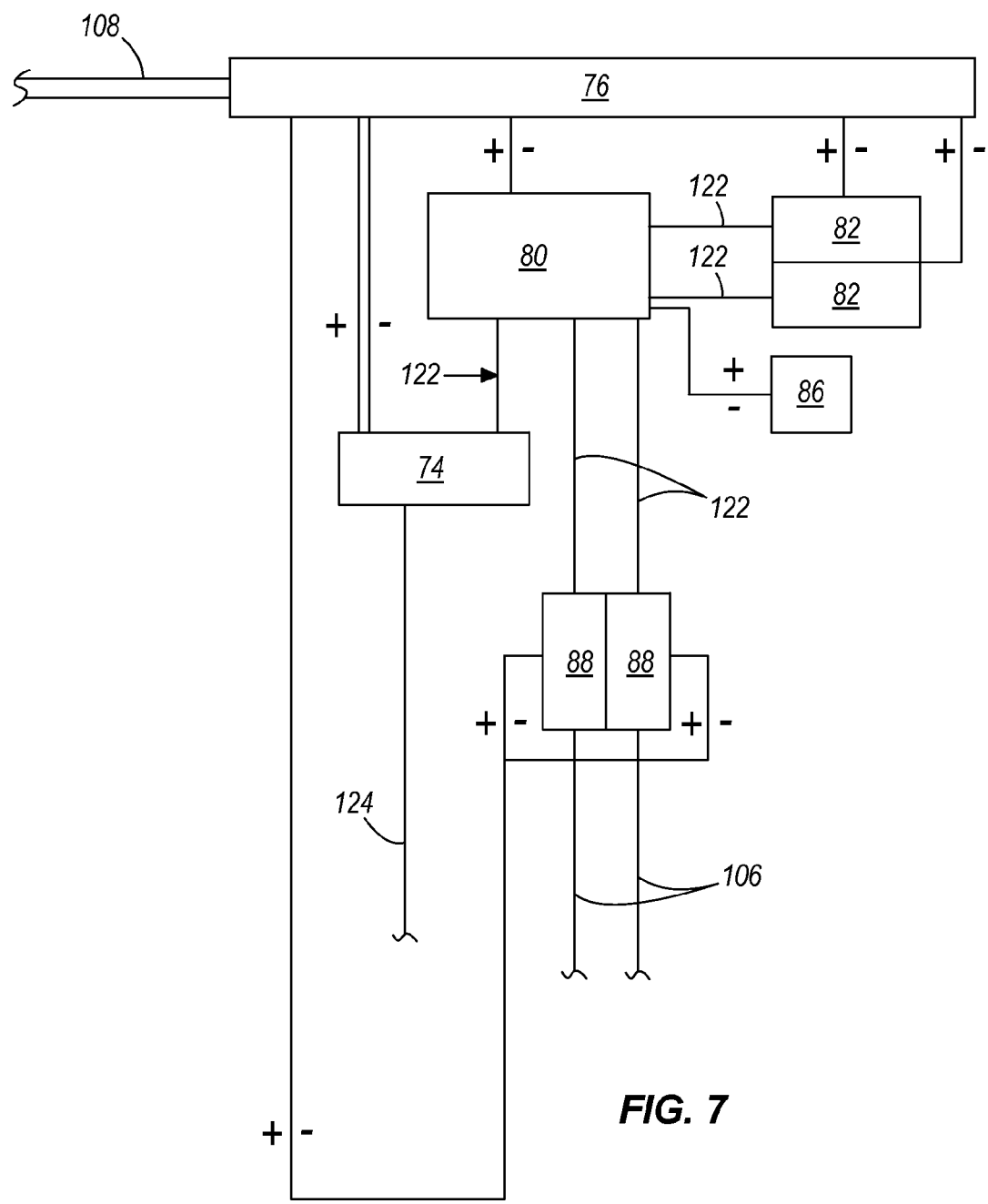
FIG. 7 shows a schematic diagram of the base computer unit arrangement of the present invention.

The base computer unit 70 is best shown in FIG. 1 and FIG. 7. The base computer unit is enclosed by a housing 72. Suitably the housing is weather proof and can protect components contained within the housing 72 from the elements. Suitably the base computer unit 70 is designed to operate within industrial-grade temperature ranges (−40 Celsius to +140 Celsius) and has the capacity to store 30 days of call data from the detection units 30, 50 if required. Positioned inside the housing 72 is a data processor 80, a data storage device 82 (such as a hard drive), a remote communication interface device 74 such as a cellular modem, cellular modem, wireless network access device, or wired network interface device. The data processor 80 is operatively connected to the data storage device 82, the remote communication interface device 74 and the audio detectors 42 of the detection units 30, 50 by way of cables suitable for the appropriate data transmission 122. The base computer unit 70 can also contain a fan 86 to cool the interior of the housing 72 to prevent the components from overheating and contain a programmable power relay controller 76, such as a PRC-1000 commercially available from SimpleComTools, at www.simplcomtools.com. The programmable power relay controller can be programmed to momentarily shut off the power to the data processor unless its clock is reset every hour. This will force the data processor to reboot if the processor or any of the software it is running crashes. When the remote communication interface device 74 is a cellular modem, satellite modem or wireless network access device, the interface device 74 can be connected to an antenna 84 mounted on the vertical structure 20 by way of a cable or other suitable connection 124.

Figure 5:
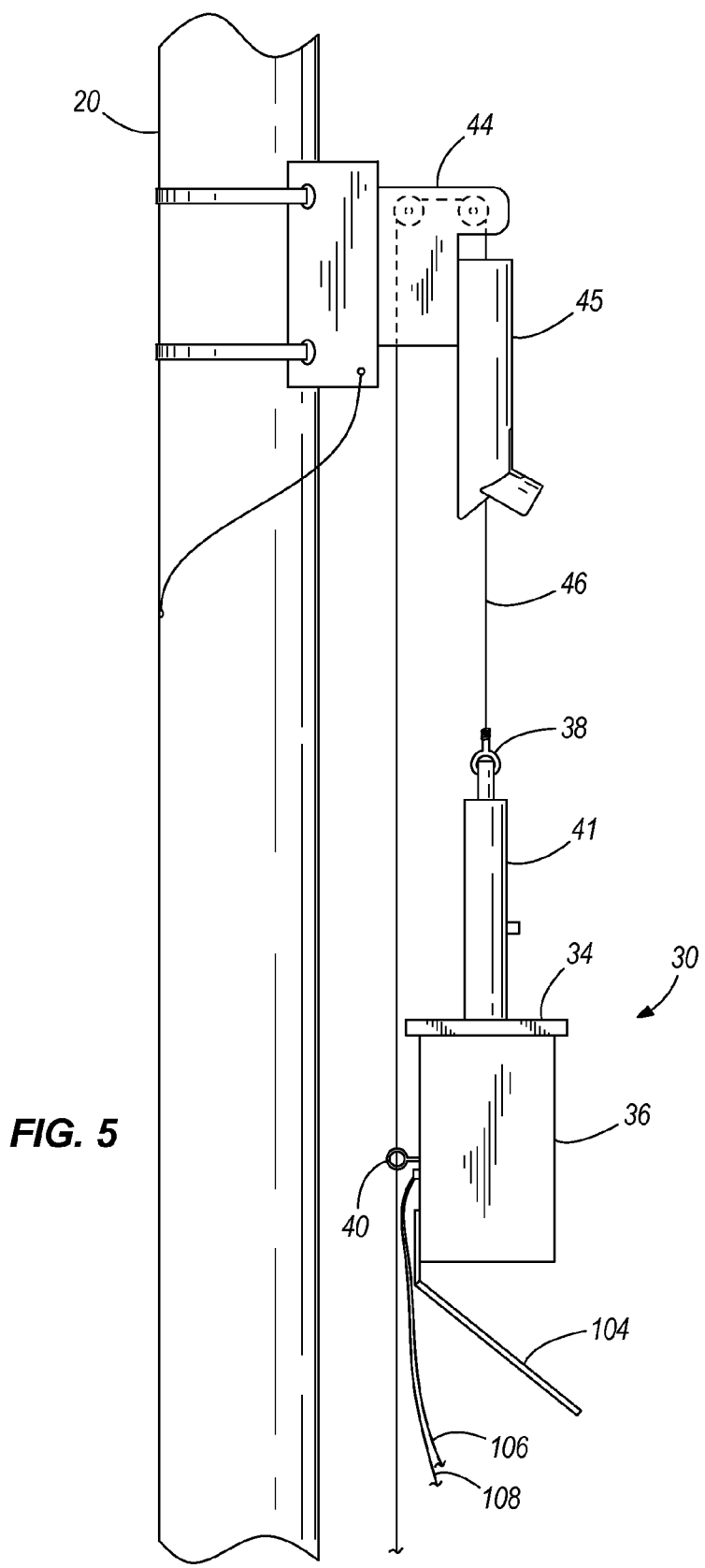
FIG. 5 shows a depiction of the detector unit mounted to the vertical structure via the connection cable and the pulley bracket.

The detection units 30, 50 can be mounted directly to the vertical structure 20 or can be connected to the vertical structure 20 by way of a connection cable 46. This arrangement is best shown in FIG. 2 and FIG. 5. If two detection units 30, 50 are used, a separate connection cable 46, 55 can be used to connect each of the detection units 30, 50 separately. The connection cable 46 can be made from any suitable material such as rope, metal cables or synthetic cables. In one embodiment the connection cable 46 is attached to a cable connector 38 can pass through the back cable connector 40 on the housing 32 of the detector unit 30. The connection cable 46 is passed over a pulley 54 or pulleys attached to the vertical structure 20, such that the connection cable 46 allows for the detection unit 30 it is attached to, to be lowered, or positioned at a specific height on the vertical structure. Suitably, the upper detector unit 30 is positioned off the vertical structure 20 at a height sufficient to detect bats within a height range of a prospective wind turbine rotor swept area. In one embodiment this height is suitably at a level of 40-60 meters above ground level. The lower detector unit 50 is suitably positioned closer to ground level. In one embodiment this height is suitably at a level of 5-10 meters above ground level.

In one embodiment the pulley 54 or pulleys can be attached to the vertical structure 20 by a pulley bracket 44. This is best shown in FIG. 3. The pulley bracket 44 comprises a mounting bracket 52 comprising metal or plastic plates which are mounted directly to the vertical structure 20. This can be by fastening the mounting bracket 52 directly to the vertical structure 20, or by using metal or plastic straps to bind the mounting bracket 52 to the vertical structure 20. The pulley 54 or pulleys are attached to the mounting bracket. In one embodiment, the pulley bracket 44 also contains a sleeve 45 attached to the bracket 44. In this embodiment the extension arm 41 of the detection unit 30 can be received by the sleeve 45 of the pulley bracket 52. In one embodiment the extension arm 41 can have a pin 43 and the sleeve 45 can have a pin receiving slot 47, such that when the detector unit 30 is raised close to the pulley bracket 44 the sleeve 45 of the pulley bracket 44 receives the extension arm 41, and locks it into position in a single orientation. This arrangement adds greater stability to the positioning of the detector unit 30.

The audio detector 42 of the detector units 30, 50 can suitably be an ultrasonic receiver. The ultrasonic receiver can be operatively connected to an ultrasonic digitizer 88 which translates the signals from the receiver into data that can be received by the data processor 80 in the base computer unit 70. A suitable ultrasonic receiver and digitizer combination is the an AR-125 or AR1-25EXT Binary Acoustic receiver commercially available from Binary Acoustic Technology (http://www.binaryacoustictech.com). In one embodiment the digitizer 88 is located in the detector unit 30, 50 in another embodiment the digitizer 88 is located in the base computer unit 70, and in another embodiment the digitizer 88 is integral to the ultrasonic receiver itself.

Figure 6:
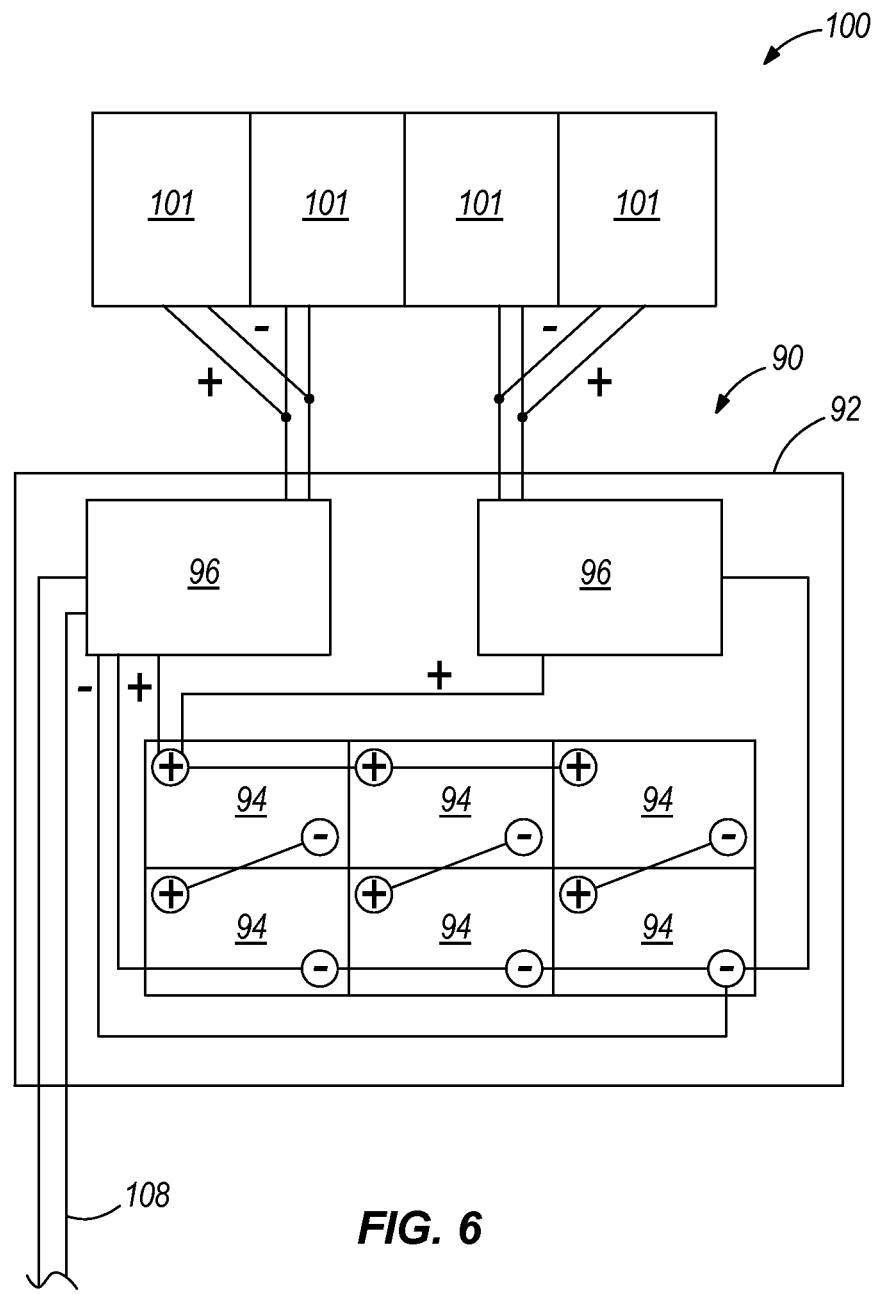
FIG. 6 shows a schematic diagram of the battery unit arrangement of the present invention.

The bat detection system can draw power off of a local municipal grid, or can be provided by a battery unit 90. In one embodiment the battery unit 90 comprises a weatherproof battery housing 92 that encloses a series of 12 volt batteries 94 and one or more charge controllers 96, the batteries 94 and the charge controllers 96 being operatively connected. Any suitable amount of batteries or chargers can be used. This arrangement is best shown in FIG. 6. The charge controllers 96 are suitably connected to an electrical generation source such as a wind turbine, hydro turbine, or a solar panel array 100. A solar panel array 100 comprises one or more solar panels 101. The array is operatively connected to the charge controller or controllers 96 in the battery unit 100. The battery unit 100 is operatively connected to the detector units 30, 50 and the base computer unit 70, by way of the programmable power relay controller 76 if present, by way of cables 108. In one embodiment the bat detection system of the present invention draws between 25-39 Watts of power in operation.

In another embodiment the invention provides a method of detecting bat sounds using the bat detection system of the invention, and transmitting and storing this information at a remote location. The audio detectors 42 feed continuous data to the data processor 80 in the base computer unit 70. The data provided by the audio detector(s) 42 contain information concerning sound detected by the audio detectors 42 including information on the intensity of the sound detected and the frequency of the sound detected.

Figure 8:
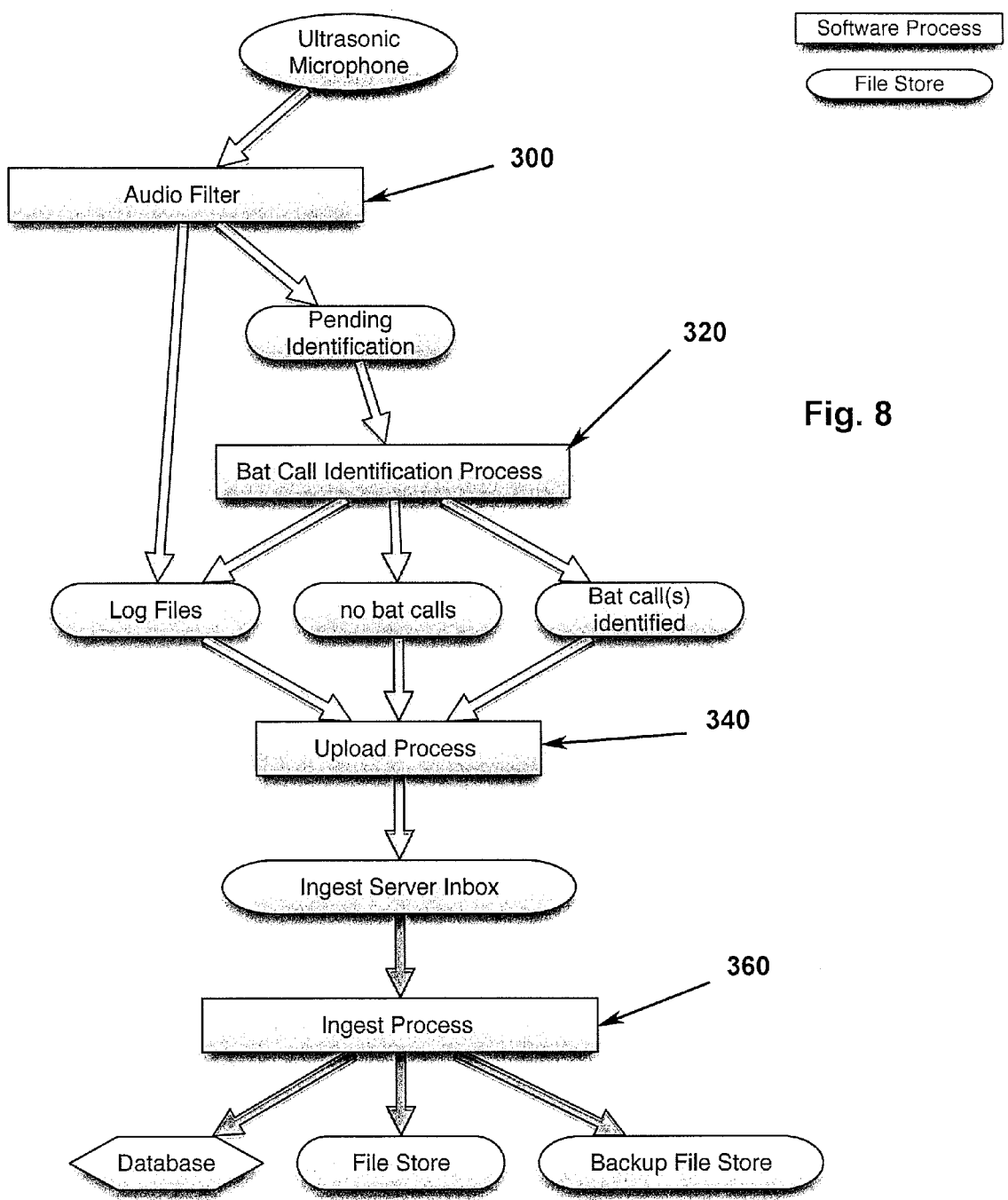
FIG. 8 shows a flowchart showing the data processor computing steps of the base computer unit in the method of the present invention.
Figure 9:
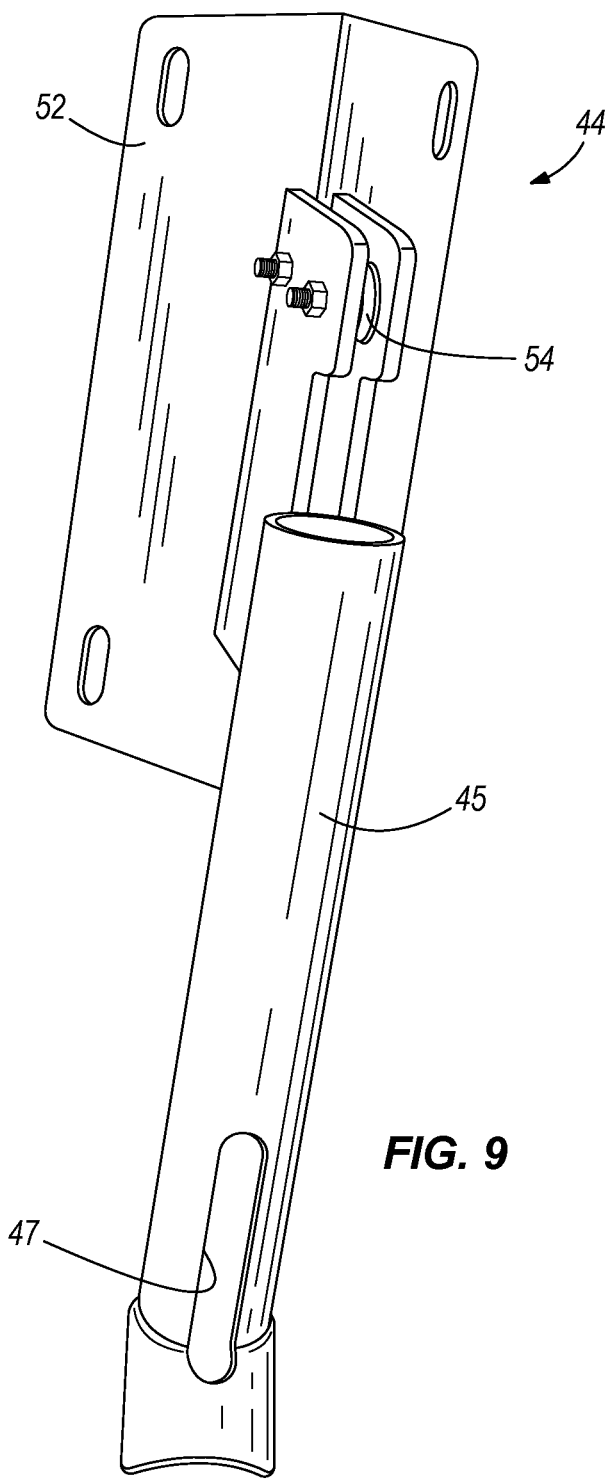
FIG. 9 shows a front view of the pulley bracket of the present invention.

The data processor 80 is programmed to run various procedures on this data. The procedures that can be run by the data processor are partially depicted by the flowchart of FIG. 8. The data processor 80 can perform a filter analysis 300 on the continuously streamed data. In the filter analysis process the data is analyzed so that when the intensity of the sound reaches a preset threshold and falls within a certain frequency range, the data processor records this data as a sound file of a fixed length on the data storage device, the sound file given a specific name. The frequency range, intensity threshold, and sound file length are all adjustable values. An example of suitable settings includes an intensity threshold of at least +18 dB, a frequency range of 15 KHz-125 KHz, and 1.7 s for a sample length. The data processor 80 can be programmed to perform the filter analysis for any desired time period. Suitably the data processor 80 is programmed to perform the filter analysis starting at one hour before sunset and ending one hour after sunrise each day. This filter analysis can suitably be performed by commercially available software SPECTR™ available from Binary Acoustic Technology (http://binaryacustictech.com).

The data processor 80 also creates a filter analysis log file on the data storage device. In this filter analysis log file the data processor 80 creates a time stamped data entry at a regular interval indicating if data is being received from the audio detector. The data processor 80 can also record in the filter analysis log file each time a sound file is recorded and record the name of the sound file and the time it was created in the filter analysis log file.

In one embodiment, when the audio filter process 300 is done for a defined period (such as a day, or time periods in a day such as pre and post midnight), the data processor 80 moves all of the recorded sound files to a date specific folder on the data storage device, the data processor marking the files "pending" for further processing. The data processor 80 also moves the filter analysis log file for the defined period to a date (or period) specific folder for processed files. The data processor 80 also adds the filter analysis log file to an upload queue and assigns the filter analysis log file a high upload priority.

The data processor 80 is also programmed to perform a bat call identification analysis 320 on the sound files recorded. In one embodiment, the bat call identification analysis 320 is performed by the data processor 80 on the sound files marked pending for further processing. The bat call identification analysis process analyzes the sound files to determine if the sound is indicative of a bat sound. The bat call identification analysis can suitably be performed by commercially available software SCAN'R™ available from Binary Acoustic Technology (http://binaryacustictech.com). If a bat sound is determined, the data processor 80 can marks in a bat analysis log file indicating if the sound file contains a bat call or does not contain a bat call.

After the bat call identification analysis 320 has been run on the sound files, the location and characteristic statistics of potential bat calls are recorded to the date specific bat analysis log file. When all of the sound files for a given day have been analyzed, the bat analysis log file for that day is added to the upload queue with a high priority. Also, after the bat call identification analysis 320 has been done, the data processor 80 compresses the sound files analyzed using a lossless audio encoder (FLAC), and moves the sound files to a date specific folder for processed audio files. The sound files are also added to an upload queue and assigned a priority. Sound files without potential bat calls are assigned a low priority. Sound files with potential bat calls are assigned a high priority.

The data processor 80 runs an upload process 80 that runs independently of the filter 300 and bat call identification 320 process. The data processor 80 reads from the upload queue, assembling a list of files to be uploaded over the internet to an inbox folder on a remote computer. This can be done by any suitably available uploading program such as Rsync, an open source software program available from http://www.samba.org/rsync/. The data processor 80 transfers each file, verifies that the file has been accurately received on the remote computer, and then deletes the file from the data storage device of the base computer unit.

In one embodiment, files are transmitted in groups of a fixed data size. Once the cumulative size of the files in the upload list exceeds the upload unit size, the files are uploaded. Suitably, no file is added to the upload list unless its priority level is equal to or greater than all other files in the upload queue.

In one embodiment, the remote computer receives the sound files from multiple bat detection systems. Each bat detection system at a different geographic location.

The remote computer can be programmed to perform an ingest process 360. In one embodiment files uploaded to the remote computer from the base computer unit 70 are stored in a ingest server inbox. In the ingest process the remote computer processes the files in this inbox and records information concerning the files into a database file stored on a data storage device associated with the remote computer. Furthermore, the remote computer can store the files in a file storage directory on a data storage device and can be duplicated in a backup file storage directory on a different data storage device.

The information recorded in the database includes the name of the sound file, whether the sound file includes a bat call, the time the sound file was recorded and the specific bat detection system that recorded the sound file.

In the ingest process, the remote computer builds a list of all files present in the ingest server inbox folder. Each file in the list is identified by file type based on the name of the file and its contents. For each file, various database records are added based on the file type. Log files are parsed and a database record is added for each line in the log file. A single record is added or updated for audio files.

After adding database records, the ingest process can copy each file to the appropriate location in the storage directory and the backup file storage directory based on vertical structure location and date. Once a file is successfully replicated to both locations it can be deleted from ingest server inbox folder.

EXAMPLE 1

Components of Bat Detection System

A bat detection system of the present invention is assembled. A tower of 60 meters is provided. Mounted at 55 meters is a first pulley bracket, with hose clamp straps being used to secure the pulley bracket to the tower. A second pulley bracket is mounted at 10 meters. The housing and extension arm of the detector units are assembled from steel with the extending platform being fashioned from Lexan® plastic. The audio detector is an AR-125 EXT ultrasonic receiver available from Binary Acoustic Technology (http://www.binaryacoustictech.com). The microphone of the AR-125 EXT receiver is mounted in the housing of the detector unit and the digitizer portion of the AR-125 EXT receiver is mounted in the housing of the base computer unit. Approximately 40 meters of steel cable is used as the connection cable. The cable is fed through the pulley bracket and then attached to the extension arm extending from the top of the housing of the upper detector unit. A second connection cable is attached to the cable connector at back of the housing—this provides a second pivot point for maneuvering the detector unit into the pulley bracket sleeve. The upper detector unit is raised by the connection cable until the extension arm of the unit is received by the sleeve of the pulley bracket and the pin of the extension are is received by the pin receiving slot of the sleeve of the pulley bracket. This pin and slot arrangement ensure that the detector is positioned in the proper orientation and that it does not swing around the pole (which may damage other met equipment). The connection cable is tied to a cleat on the pole securing the vertical positioning of the detector unit. A similar procedure is used to secure the lower detection unit to the lower pulley bracket.

The base computer unit is assembled using a housing with is a NEMA type 4 steel box available from www.newark.com. The data processor, which is an Industrial Intel Atom Motherboard with a 32 GB CF card boot drive is mounted in the housing. The boot drive is loaded with Windows XP, SPECT'R® bat analysis software available from Binary Acoustic Technology (http://www.binaryacoustictech.com), Logmein IT reach remote login software available from http://www.logmein.com), Rsynch software available from http://www.samba.org/rsync/, and the program used to run the method of the present invention. A 500 GB 2.5" hard drive is mounted in the housing and connected to the motherboard with standard cables. A modem, which is a Sierra Wireless Pinpoint X cellular modem is connected to the data processor and is also mounted in the housing. The modem is connected by the appropriate cables to an EV-DO dipole antenna available from Sierra Wireless. The antenna is mounted on the tower at 30 meters.

An ATX power supply is connected to the motherboard and the other computer components either directly or through the motherboard. The ATX power supply is connected to the programmable relay controller which is a PRC-1000 controller available from SimpleComTools, at www.simplcomtools.com. The relay controller is connected to, and draws power from, the battery unit by the appropriate cables.

The battery unit is assembled from a battery housing which is a weather proof battery box available from commercial retailers such as Target. In the housing is placed six 12 v rechargeable industrial battery blocks, model EVGC6A-A available from http://discover-energy.com. The batteries are connected to each other and are connected to a Blue Sky Energy SOLAR BOOST 3024i 30A, 12/24V charge controller which is also contained in the battery unit housing. The charge controller is connected by suitable cables to an array consisting of two Kyocera KD135GX-LP 135 W 12V Solar Panels mounted on a steel pole next to the battery unit.

This arrangement can power the detector units and the base computer unit continually by solar power, and for 3-5 days even with no sun. The overall power needs of the combine detector units and base computer unit not exceeding 30 watts.

While the present invention has now been described and exemplified with some specificity, those skilled in the art will appreciate the various modifications, including variations, additions, and omissions that may be made in what has been described.

What is claimed is:

1. A bat detection system comprising:
   an upper bat echo-location call detection unit comprising
      an upper bat echo-location call detection unit housing and an audio detector connected to the bat echo-location call detection unit housing;
   a base computer unit comprising a base computer unit housing which encloses a data processor, a data storage device, and
   a remote communication interface device;
   wherein the data processor is operatively connected to the data storage device, remote communication interface device, and the upper bat echo-location call detection unit audio detector,
   wherein the audio detector feeds continuous data to the data processor in the base computer unit, and wherein the data processor determines whether a detected sound is indicative of a bat sound.

2. The bat detection system of claim 1 wherein the bat echo-location call upper detection unit is connected to a vertical structure by a connection cable connected to the housing of the upper bat echo-location call detection unit, the connection cable passing through a first pulley attached to the vertical structure, the connection cable allowing the upper detection unit to be raised, lowered, or positioned at a specific height on the vertical structure.

3. The system of claim 2 further comprising:
a lower bat echo-location call detection unit comprising a lower bat echo-location call detection unit housing and an audio detector connected to the lower bat echo-location call detection unit housing; and
wherein the audio detector of the lower bat echo-location call detection unit is operatively connected to the data processor.

4. The system of claim 3 wherein the lower bat echo-location call detection unit is connected to the vertical structure by a second connection cable connected to the housing of the bat echo-location call lower detection unit, the second connection cable passing through a second pulley attached to the vertical structure, the second connection cable allowing the lower bat echo-location call detection unit to be raised, lowered, or positioned at a specific height.

5. The system of claim 2 wherein the pulley is attached to the vertical structure by a pulley bracket, the bracket comprising a mounting bracket mounted directly to the vertical structure, the pulley attached to the mounting bracket; and an arm receiving sleeve attached to the mounting bracket.

6. The system of claim 5 wherein the upper bat echo-location call detection unit further comprises an extension arm having a first and second end, the first end having a cable connector on which the connection cable is attached to, the second end being connected to the housing of the upper bat echo-location call detection unit; wherein the extension arm can be received by the arm receiving sleeve of the pulley bracket.

7. The system of claim 1 wherein the audio detector comprises an ultrasonic receiver.

8. The system of claim 7 wherein the base computer unit further comprises an ultrasonic digitizer which is operatively connected to the ultrasonic receiver and the data processor.

9. The system of claim 1 wherein the audio detector comprises an ultrasonic receiver which is connected to an ultrasonic digitizer connected to the housing of the upper detection unit.

10. The system of claim 1 further comprising a solar panel array operatively connected to a battery unit which in turn is operatively connected to the upper detection unit and the base computer unit.

11. A method of detecting bat sounds comprising:
providing a bat detection system, including;
an upper bat echo-location call detection unit comprising an upper bat echo-location call detection unit housing and an audio detector connected to the bat echo-location call detection unit housing;
a base computer unit comprising a base computer unit housing which encloses a data processor, a data storage device, and
a remote communication interface device;
wherein the data processor is operatively connected to the data storage device, remote communication interface device, and the upper bat echo-location call detection unit audio detector,
wherein the audio detector feeds continuous data to the data processor in the base computer unit,
wherein the data processor is suitably programmed to perform, and performs, a filter analysis of the continuous stream of data from the audio detector so that when the intensity of the sound reaches a preset threshold and falls within a certain frequency range, the data processor records this data as a sound file of UP to a fixed length on the data storage device, and
wherein the data processor determines whether a detected sound is indicative of a bat sound,
wherein the data comprises information concerning sound detected by the audio detector including information on the intensity of the sound detected and the frequency of the sound detected.

12. The method of claim 11 wherein the sound file is of a fixed length.

13. The method of claim 12 wherein the data processor is suitably programmed to create, and creates, a log file on the data storage device, wherein the data processor creates a time stamped data entry into the log file at a regular interval indicating if data is being received from the audio detector.

14. The method of claim 13 wherein the data processor is suitably programmed to record, and records, in the log file each time a sound file is recorded and records the name of the sound file and the time it was created in the log file.

15. The method of claim 12 wherein the data processor is suitably programmed to perform, and performs, the filter analysis of the continuous stream of data from the audio detector starting at one hour before sunset and ending one hour after sunrise each day.

16. The method of claim 12 wherein the data processor is suitably programmed to perform, and performs, a bat call identification analysis on the sound files recorded in the filter analysis process to determine whether the sound file contains a bat sound; and wherein the data processor marks in a log file on the data storage device indicating if the sound file has a bat call or no bat call.

17. The method of claim 12 wherein the data processor is suitably programmed to transmit, and transmits, the sound file via the remote communication interface device to a remote computer.

18. The method of claim 17 wherein the remote computer is suitably programmed to receive, and receives, sound files from multiple bat detection systems, each bat detection system in a different geographic location.

19. The method of claim 18 wherein the remote computer is suitably programmed to run, and runs, an ingest process, the ingest process recording information concerning the sound files into a database file stored on a data storage device associated with the remote computer, the information recorded in the database including the name of the sound file; whether the sound file includes a bat call; the time the sound file was recorded; and the specific bat detection system that recorded the sound file.

20. A method of detecting bat sounds comprising:
providing an audio detector operatively connected to a data processor;
detecting the sounds of bats by the audio detector, wherein the detector feeds continuous data to the data processor, wherein the data comprises information concerning sound detected by the audio detectors including information on the intensity of the sound detected and the frequency of the sound detected;
wherein the data processor is suitably programmed to perform, and performs, a filter analysis of the continuous stream of data from the audio detector so that when the intensity of the sound reaches a preset threshold and falls within a certain frequency range, the data processor records this data as a sound file of a fixed length on a data storage device operatively connected to the data processor;

wherein the data processor is suitably programmed to perform, and performs, a bat call identification analysis on the sound files recorded in the filter analysis process to determine whether the sound file contains a bat sound;

wherein the data processor marks in a log file on the data storage device indicating if the sound file has a bat call or no bat call; and wherein the data processor is suitably programmed to transmit, and transmits, the sound file, via a remote communication interface device operatively connected to the data processor, to a remote computer, and wherein the data processor analyzes and determines whether a sound detected by the auto detector is indicative of a bat sound.

21. The method of claim 20 wherein the remote computer is suitably programmed to receive, and receives, sound files from multiple audio detectors, each audio detector in a different geographic location.

22. A bat echo-location detection unit, comprising:
a housing having an interior side, an exterior side and at least one opening between the interior side and the exterior side; and
an ultrasonic receiving audio detector located at least partly in the interior of the housing, wherein the detector is located to detect sound through the opening,
wherein the housing further comprises a flat one-direction reflection plate positioned to allow sound to reflect directly from the reflection plate to the detector,
wherein the reflection plate is located at a lower end of the exterior side of the housing,
wherein the reflection plate is located at a lower end of the exterior side of the housing,
wherein the housing further comprises a back wall, and the reflection plate is connected to the back wall at approximately a 45 degree angle from the back wall,
wherein the reflection plate is positioned at approximately a 45 degree angle from the opening.

23. The unit of claim 22, wherein the reflection plate is wider than the opening exterior side of the housing.

24. The unit of claim 22, wherein the reflection plate is connected to the housing by one or more supports.

25. The unit of claim 22, wherein the exterior side of the housing further comprises an extension arm located at a top end of the housing.

26. The unit of claim 25, wherein the first end of the connection cable is connected to the extension arm.

27. The unit of claim 25, further comprising:
a housing locking mechanism located on the exterior side of the housing; and
a complementary bracket locking mechanism located on the bracket, whereby the housing may be secured to the bracket.

28. The unit of claim 22, wherein the housing further comprises lightning protection devices.

29. The unit of claim 22, further comprising:
a mounting bracket attachable to a vertical structure; and
a connection cable having a first end and a second end,
wherein the first end of the connection cable is connected to the exterior side of the upper detection unit housing, and
wherein the connection cable is movable through the bracket so that the height of the housing may be adjusted relative to the bracket.

30. The unit of claim 29, wherein the first end of the connection cable is connected to the extension arm.

31. The unit of claim 29, further comprising:
a housing locking mechanism located on the exterior side of the housing; and
a complementary bracket locking mechanism located on the bracket, whereby the housing may be secured to the bracket.

32. The unit of claim 29, wherein the housing further includes a back connection cable connector.

33. The unit of claim 32, wherein the housing further includes a back connection cable connector.

* * * * *